United States Patent
Budell et al.

(10) Patent No.: US 8,429,590 B2
(45) Date of Patent: Apr. 23, 2013

(54) SYSTEM-LEVEL METHOD FOR REDUCING POWER SUPPLY NOISE IN AN ELECTRONIC SYSTEM

(75) Inventors: Timothy W. Budell, Westford, VT (US); Eric W. Tremble, Jericho, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/184,909

(22) Filed: Jul. 18, 2011

(65) Prior Publication Data
US 2013/0024831 A1   Jan. 24, 2013

(51) Int. Cl.
G06F 17/50 (2006.01)
G06F 9/455 (2006.01)
G06F 11/22 (2006.01)
G06G 7/62 (2006.01)
G06G 7/54 (2006.01)

(52) U.S. Cl.
USPC ............... 716/133; 716/136; 703/13; 703/18

(58) Field of Classification Search ......................... None
See application file for complete search history.

(56) References Cited

U.S. PATENT DOCUMENTS

| | | | |
|---|---|---|---|
| 6,154,083 A | 11/2000 | Gaudet et al. | |
| 6,587,815 B1 | 7/2003 | Aingaran et al. | |
| 6,941,258 B2 | 9/2005 | Van Heijningen et al. | |
| 6,952,814 B2 | 10/2005 | Joseph et al. | |
| 7,353,469 B2 | 4/2008 | Ogawa | |
| 7,523,430 B1 | 4/2009 | Patel | |
| 7,533,357 B2 | 5/2009 | Carlsen et al. | |
| 7,688,611 B2 | 3/2010 | Arsovski et al. | |
| 2007/0225959 A1* | 9/2007 | Grochowski et al. | 703/15 |
| 2008/0046789 A1 | 2/2008 | Arsovski et al. | |
| 2009/0150138 A1 | 6/2009 | Kobayashi | |
| 2011/0288829 A1* | 11/2011 | Bickford et al. | 703/2 |

OTHER PUBLICATIONS

Na et al., "The Effects of On-chip and Package Decoupling Capacitors and an Efficient ASIC Decoupling Methodology", 2004 Electronic Components and Technology Conference, 2004 IEEE, pp. 556-567.

* cited by examiner

*Primary Examiner* — A. M. Thompson
(74) *Attorney, Agent, or Firm* — Richard M. Kotulak; Hoffman Warnick LLC (57) ABSTRACT

In one embodiment, a method for reducing power supply noise within an electronic system that includes an integrated circuit (IC), a package, and a printed circuit board (PCB) connected by a plurality of power delivery networks (PDN) is disclosed. Power supply noise within the system is reduced by defining a voltage compression limit for each PDN of the electronic system; determining a voltage compression for each PDN of the electronic system during a plurality of switching events; comparing the voltage compression of each PDN of the electronic system to the voltage compression limit for each switching event; and in response to the voltage compression of each PDN of the electronic system exceeding the limit, modifying the electronic system to reduce the voltage compression below the limit.

18 Claims, 6 Drawing Sheets

SYSTEM-LEVEL METHOD FOR REDUCING POWER SUPPLY NOISE IN AN ELECTRONIC SYSTEM

BACKGROUND OF THE INVENTION

The subject matter disclosed herein relates generally to a system including an integrated circuit (IC), a package, and a printed circuit board (PCB). More specifically, the disclosure provided herein relates to methods of reducing power supply noise in a system including an IC, a package, and a PCB.

All electronic systems exhibit resonances at which power supply impedance increases significantly. Switching events having frequency components near such resonances can dramatically increase the overall power supply noise of the electronic system. This power supply noise can reduce timing margins on critical paths within the system and/or cause intermittent failure of data buses and other functional circuitry within the system.

Plots of impedance with respect to frequency at the ports of an electrical system have been used to determine impedance magnitudes and the frequencies at which resonances occur. However, these plots fail to provide any insight on whether the electrical system will suffer functional issues due to resonance, as the magnitude of the power supply noise is a function of the impedance and current at each frequency.

BRIEF DESCRIPTION OF THE INVENTION

Aspects of the invention provide for reducing power supply noise in an electronic system including an integrated circuit (IC), a package, and a printed circuit board (PCB). In one embodiment, aspects of the invention include a method for reducing power supply noise within an electronic system including an integrated circuit (IC), a package, and a printed circuit board (PCB) connected by a power delivery network (PDN), the method comprising: defining a voltage compression limit for each PDN of the electronic system; determining a voltage compression for each PDN of the electronic system during a plurality of switching events; comparing the voltage compression of each PDN of the electronic system to the voltage compression limit for each switching event; and in response to the voltage compression of a PDN of the electronic system exceeding the limit for the PDN, modifying the electronic system to reduce the voltage compression below the limit for the PDN.

A first aspect of the invention provides a method for reducing power supply noise within an electronic system including an integrated circuit (IC), a package, and a printed circuit board (PCB) connected by a power delivery network (PDN), the method comprising: defining a voltage compression limit for each PDN of the electronic system; determining a voltage compression for each PDN of the electronic system during a plurality of switching events; comparing the voltage compression of each PDN of the electronic system to the voltage compression limit for each switching event; and in response to the voltage compression of a PDN of the electronic system exceeding the limit for the PDN, modifying the electronic system to reduce the voltage compression below the limit for the PDN.

A second aspect of the invention provides a non-transitory computer-readable medium, which when executed, enables a computer system to implement a method of reducing power supply noise within an electronic system, the method comprising: designing a model of the electronic system, the model including a circuit representation of an integrated circuit (IC), a package, and a printed circuit board (PCB) connected by a plurality of power delivery networks (PDN); defining a voltage compression limit for each PDN of the electronic system; determining a voltage compression for each PDN of the electronic system during a plurality of switching events; comparing the voltage compression of each PDN of the electronic system to the voltage compression limit for each switching event; and in response to the voltage compression of a PDN of the electronic system exceeding the limit for the PDN, modifying the electronic system to reduce the voltage compression below the limit for the PDN.

A third aspect of the invention provides a method of generating a computer system for reducing power supply noise within an electronic system, the method comprising: providing a computer system operable to: design a model of the electronic system, the model including a circuit representation of an integrated circuit (IC), a package, and a printed circuit board (PCB) connected by a plurality of power delivery networks (PDN); define a voltage compression limit for each PDN of the electronic system; determine a voltage compression for each PDN of the electronic system during a plurality of switching events; compare the voltage compression of each PDN of the electronic system to the voltage compression limit for each switching event; determine, based on the comparing, which of the plurality of switching events is a dominant switching event for each PDN of the electronic system, wherein the dominant switching event is a switching event with the most voltage compression; and in response to the voltage compression of each PDN of the electronic system exceeding the limit for the PDN during the dominant switching event, modify the electronic system to reduce the voltage compression below the limit for the PDN.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to a system including an integrated circuit (IC), a package, and a printed circuit board (PCB). More specifically, the disclosure provided herein relates to methods of reducing power supply noise in a system including an IC, a package, and a PCB.

All electronic systems exhibit resonances at which power supply impedance increases significantly. Switching events having frequency components near such resonances can dramatically increase the overall power supply noise of an electronic system. Such power supply noise can reduce timing margins on critical paths within the system and/or cause intermittent failure of data buses and other functional circuitry within the system.

Plots of impedance with respect to frequency at the ports of an electrical system have been used to determine impedance magnitudes and the frequencies at which resonances occur. However, these plots fail to provide any insight on whether the electrical system will suffer functional issues due to resonance, as the magnitude of the power supply noise is a function of the impedance and current at each frequency.

Adequately suppressing power supply noise in today's microelectronic systems requires, at a minimum, the availability of low-impedance on-chip decoupling capacitors as local charge reservoirs. Adding package capacitors can also change the frequencies of resonance and lower peak power supply impedances. Common methods for attempting to avoid by design the possibility of functional issues owing to resonance include trying to flatten a power-supply impedance curve versus frequency by adding capacitors in various places in the system, such that the impedance at all frequencies is less than a target impedance.

Figure 1:
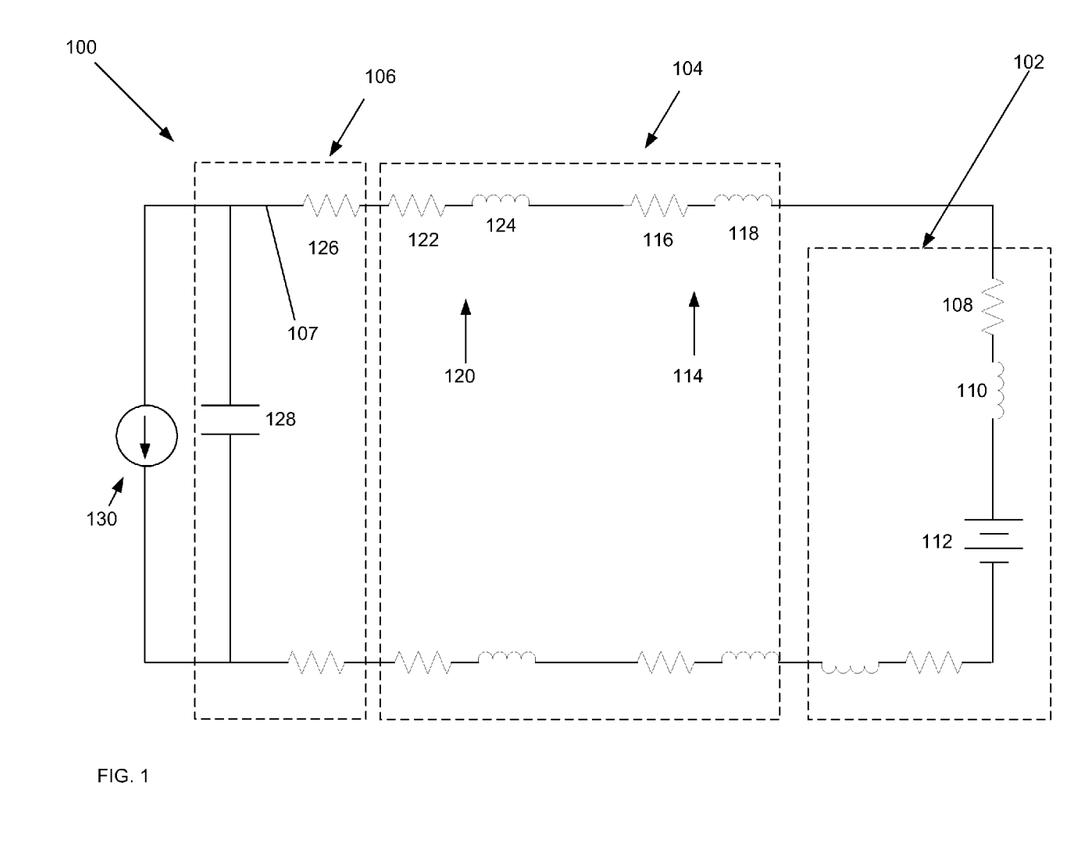
FIG. 1 shows a circuit diagram of a power delivery network according to an embodiment of the invention.

Turning now to FIG. 1, a circuit diagram of a power distribution network (PDN) 100 of an electronic system is shown. Portions of the PDN 100 physically reside on a printed circuit board (PCB) 102, a package 104, and an integrated circuit (IC) 106. The PCB 102, the package 104, and the IC 106 are connected by a supply rail 107. As seen in FIG. 1, the PCB 102 is represented as a resistor 108 and an inductor 110 and includes an ideal voltage source 112. The package 104 includes a lower package portion 114, that is represented by a resistor 116 and an inductor 118, and an upper package portion 120, that is also represented by a resistor 122 and an inductor 124. The IC 106 is represented by a resistor 126 and an on-chip capacitor 128, which represents the on-chip capacitance. Also shown in FIG. 1 are various resistors and inductors at the lower portion of the circuit diagram, which represent the return path of the PCB 102, the package 104, and the IC 106.

The PDN 100 in FIG. 1 also includes a transient current source 130. This transient current source 130 is connected in parallel to the on-chip capacitor 128 of the IC 106 and provides the current step that excites the circuit, according to the method described herein.

It is understood that this circuit diagram of the PDN 100 shown in FIG. 1 is simplified to its essential electrically equivalent elements within PCB 102, package 104, and IC 106 for efficiency and clarity. A more complicated circuit diagram of the PDN 100 may be used to represent the electronic system.

Figure 2:
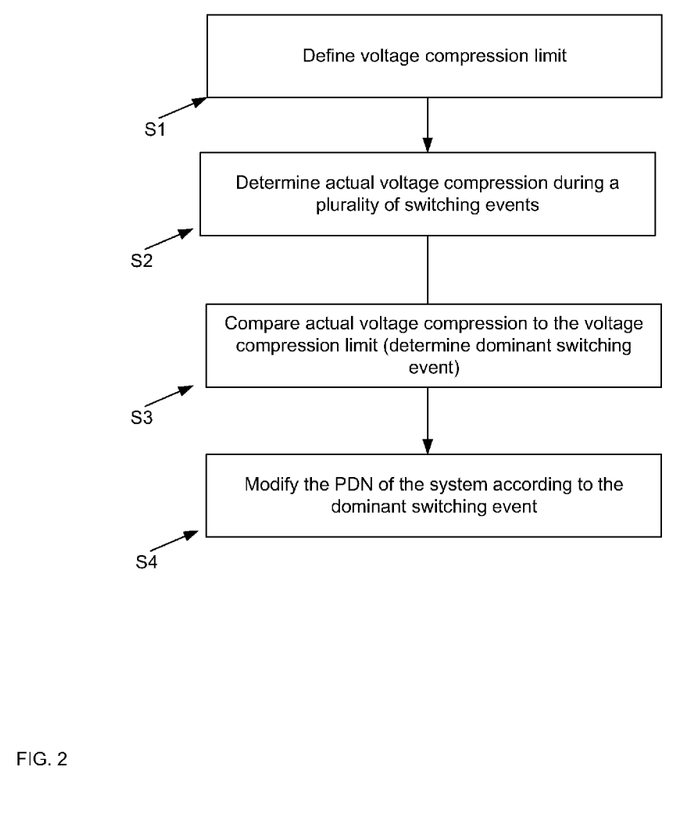
FIG. 2 shows a method flow diagram according to an embodiment of the invention.

Referring now to FIG. 2, a method for reducing power supply noise within the PDN 100 of an integrated circuit, as shown in FIG. 1, will be described. First, at process S1, a limit for a voltage compression of the PDN 100 is defined. The voltage compression limit is chosen to ensure proper electrical behavior of the system. An example of a voltage compression limit for the PDN 100 is approximately 8% of the nominal supply voltage. If the voltage of the ideal voltage source 112 in PCB 102 is 1 volt (V), the voltage across on-chip capacitor 128 must be between 1.08 V and 0.92 V in this example in order to maintain proper operation of the system. If there is too much power supply noise, the voltage across on-chip capacitor 128 may exceed 1.08 V or be below 0.92 V, and the PDN 100 of the electronic system must be modified accordingly to reduce the noise below the limit.

Suddenly increasing current draw will cause transient voltage compression on a power supply rail. Decreasing current draw will cause a transient increase in voltage on the power supply rail (i.e., voltage "bounce"). Noise is often discussed in terms of "peak-to-peak", meaning the total transient voltage excursion from minimum to maximum. Although the method for reducing power supply noise within the PDN 100 shown in FIG. 1 refers to a limit for voltage compression, it is understood that other metrics may be used in the method to reduce power supply noise.

Once the voltage compression limit for the PDN 100 is defined, at process S2, the actual voltage compression of the PDN 100 is determined under a plurality of switching events. The total actual voltage compression of the PDN 100 is the sum of self noise, which results from switching of circuits connected to the PDN 100 on the IC 106, and trans-noise, which results from switching activity on other PDNs. For example, as will be described later herein with respect to FIG. 5, multiple PDNs may be connected.

The plurality of switching events includes events that are known to cause power supply noise, which affects the on-chip power supply voltages, and in turn, can affect the operation of the electronic system. The plurality of switching events includes, but is not limited to, a single switching event, multiple switching events, and a switching event that excites resonance. A single switching event is a switching event that occurs after a long quiet period. Multiple switching events are where a number of switching events happen quickly in succession before the package 104 and the PCB 102 begin delivering significant charge to the IC 106. A switching event that excites resonance is an event that draws charge out of the PDN 100 at substantially the same frequency as the system natural resonant frequency, which can cause large power supply noise in the PDN 100.

The actual voltage compression of the PDN 100 as a result of trans-noise may also be determined. Trans-noise results from activity on other power delivery networks (PDNs) (the aggressor supplies) that interact with a victim PDN, for example by way of a common return path. An aggressor PDN's activity can transfer energy in the form of power supply noise to a victim PDN. The total actual voltage compression of the PDN 100 is determined by adding the trans-noise components from the aggressor PDNs on the victim PDN (e.g., PDN 100) with the self noise component of the victim PDN 100. This sum is the total actual voltage compression of the victim PDN, for example, PDN 100.

In order to determine the voltage compression of the PDN 100 under each of the plurality of switching events, the voltage across the on-chip capacitor 128 is determined, either analytically or with an analog circuit simulator (not shown). The transient current source 130 (FIG. 1) creates a change in current that excites the PDN 100. This change in current may be a single event or repetitive events, and such repetition may occur at a particular frequency. A single event will create voltage compression across on-chip capacitor 128 that is proportional to the ratio of charge moved by the event and the charge stored in capacitor 128. Repetitive events will create voltage compression that is proportional to the charge moved by the events in one-quarter of the system natural resonant period and the charge stored in capacitor 128. It is understood that the system natural resonant period is a function of the capacitance of on-chip capacitor 128 and the inductance of inductors 124, 118, and 110 and their counterparts at the bottom of FIG. 1. Events that repeat at the system natural resonant frequency will create noise proportional to the average current of source 130 times the impedance at the system natural resonant frequency. It is understood that such impedance can be determined in a separate step, using an analog simulator, by replacing transient current source 130 with an alternating current (AC) source, sweeping the current through all frequencies, and measuring the resulting voltage across capacitor 128. The ratio of the measured voltage to the current is impedance.

At process S3, the actual voltage compression of the PDN 100 under each of the plurality of switching events is compared to the voltage compression limit defined at process S1. This may include determining which event of the plurality of switching events is the dominant switching event. For example, the switching event that exceeds the voltage compression limit the most is the dominant switching event. This is the switching event that causes the most power supply noise in the PDN 100.

Figure 3:
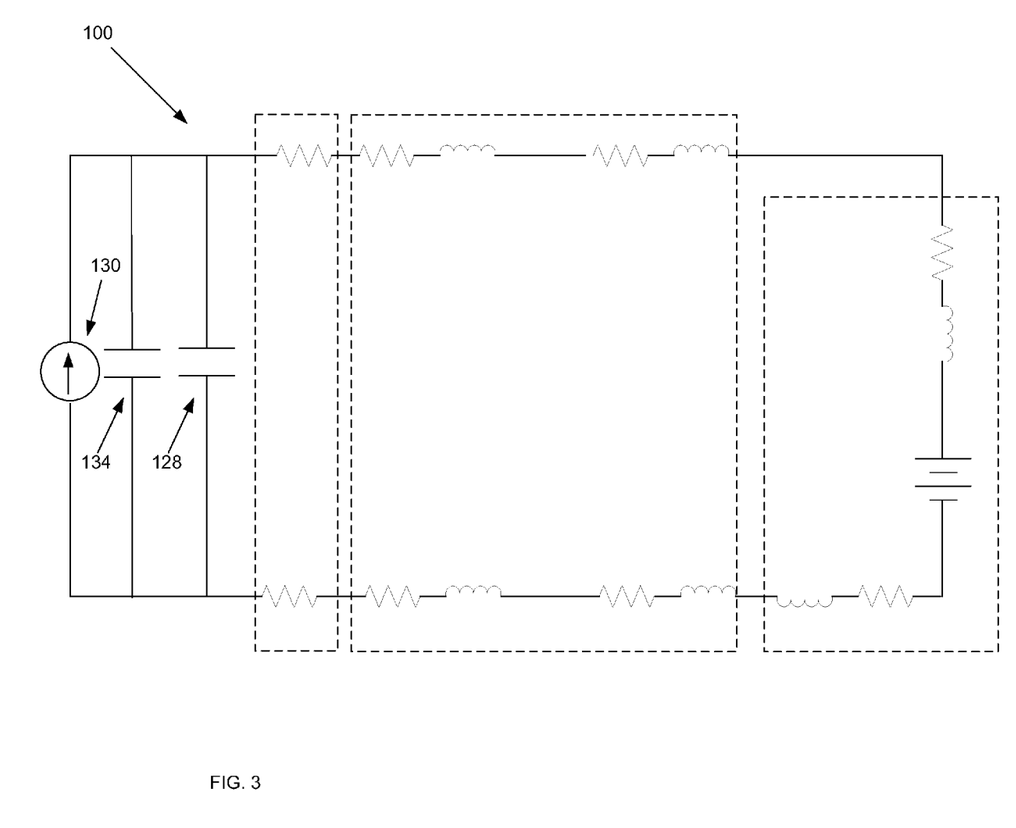
FIG. 3 shows a circuit diagram of a power delivery network according to an embodiment of the invention.

At process S4, the PDN 100 of the system is modified according to the dominant switching event. In other words, the PDN 100 of the system is modified according to which switching event causes the most power supply noise that exceeds the limit, in order to reduce the power supply noise below the limit. The modification to the PDN 100 of the system may be either adding on-chip capacitance or adding package capacitance. The modification performed on the PDN 100 of the system depends on which switching event is the dominant switching event. For example, if the dominant switching event is the single switching event or multiple switching events, or if trans-noise is a significant component of total voltage compression, the modification may be adding on-chip capacitors. As seen in FIG. 3, a second on-chip capacitor 134 is added in parallel to on-chip capacitor 128. A plurality of on-chip capacitors 134 may be added in order to appropriately reduce the power supply noise of the PDN 100 below the limit.

If the dominant switching event is the switching event that excites resonance, or if the addition of on-chip capacitance does not sufficiently reduce the power supply noise caused by the multiple switching events, the modification may include, for example, adding package capacitors to the PDN 100. An example of adding a package capacitor 136 is shown in FIG. 4.

In an alternate embodiment, the various inductances of the system can be reduced by, for example, adding additional vias in the package or PCB; adding additional connections between the PCB and package or package and IC; or adding capacitors on the PCB immediately under the package. These approaches may be used in conjunction with any of the modifications discussed above to reduce the voltage compression below the limit.

Figure 4:
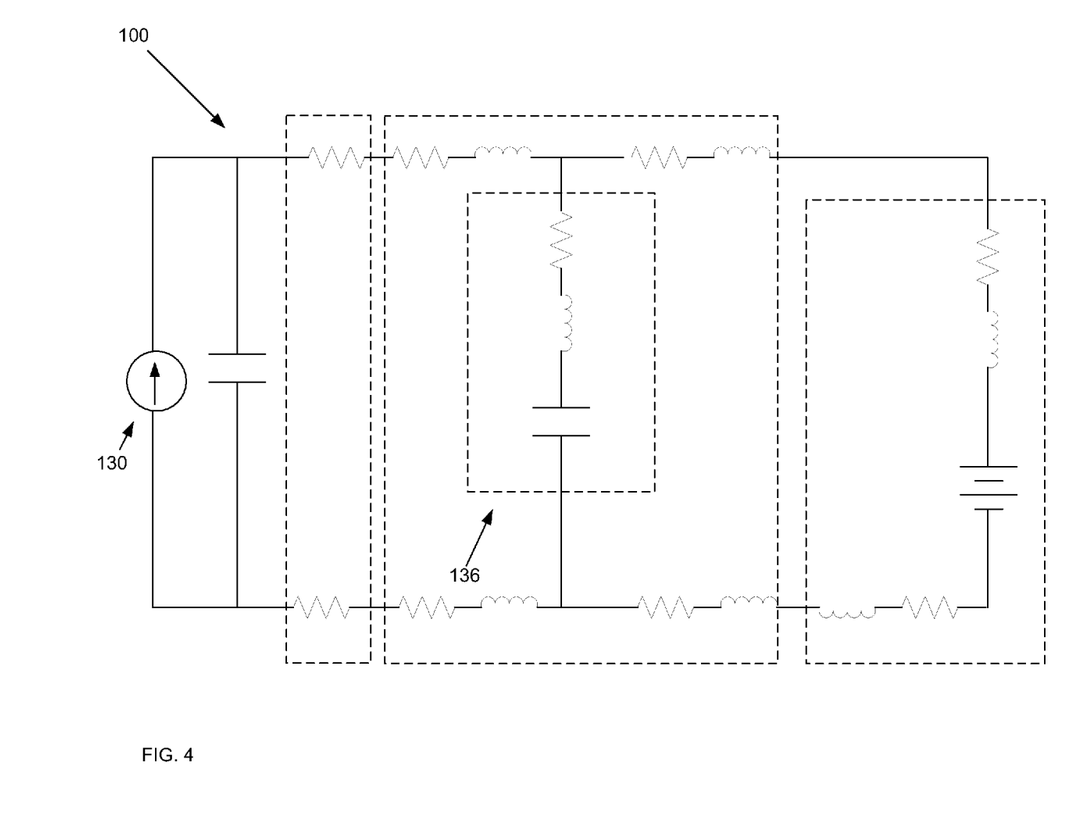
FIG. 4 shows a circuit diagram of a power delivery network according to an embodiment of the invention.
Figure 5:
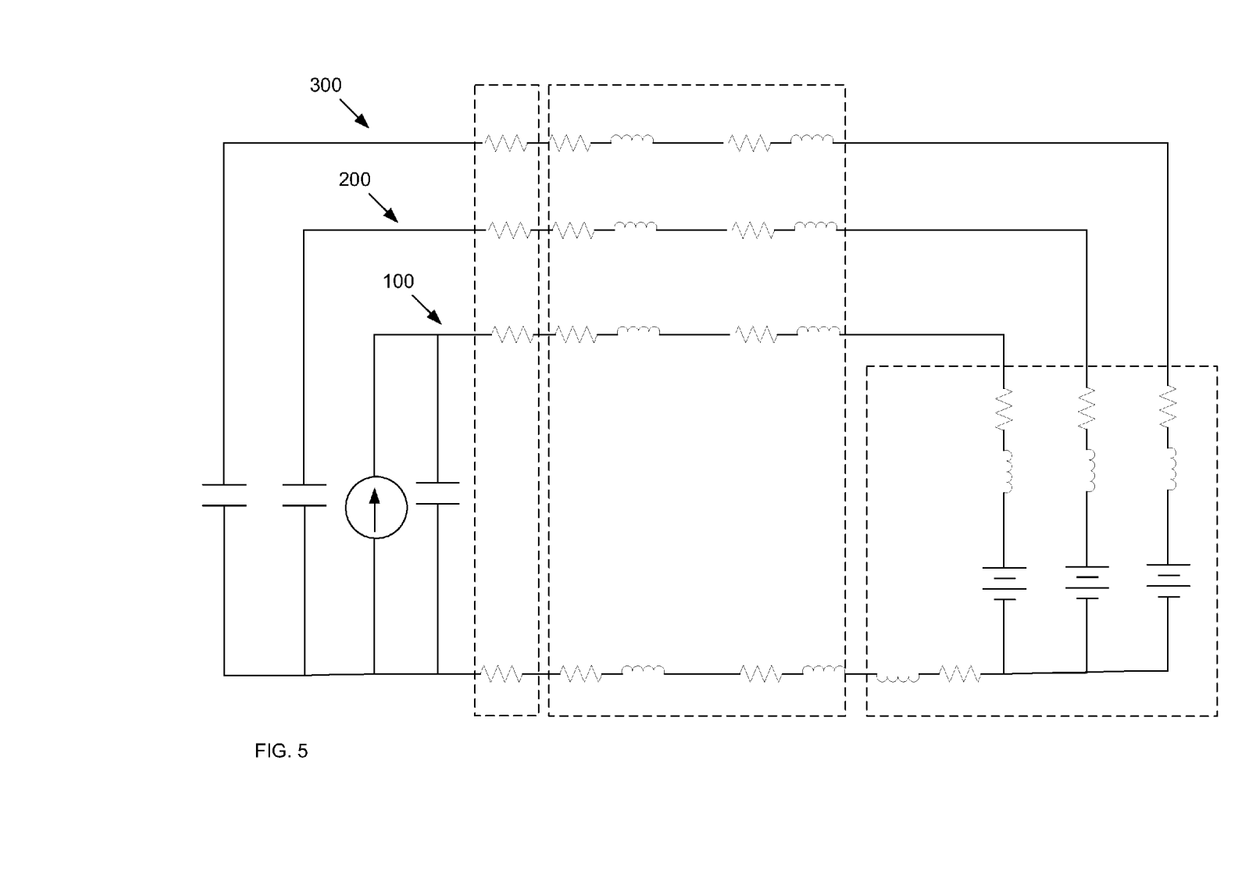
FIG. 5 shows a circuit diagram of a power delivery network according to an embodiment of the invention.

FIGS. 1, 3 and 4 are shown including only one PDN 100. However, it is understood that any number of PDNs may be part of the electronic system. As seen in FIG. 5, an alternative embodiment including three PDNs is shown. Examples of PDNs include, but are not limited to, those that supply power to core logic, memory, and input/output drivers.

Figure 6:
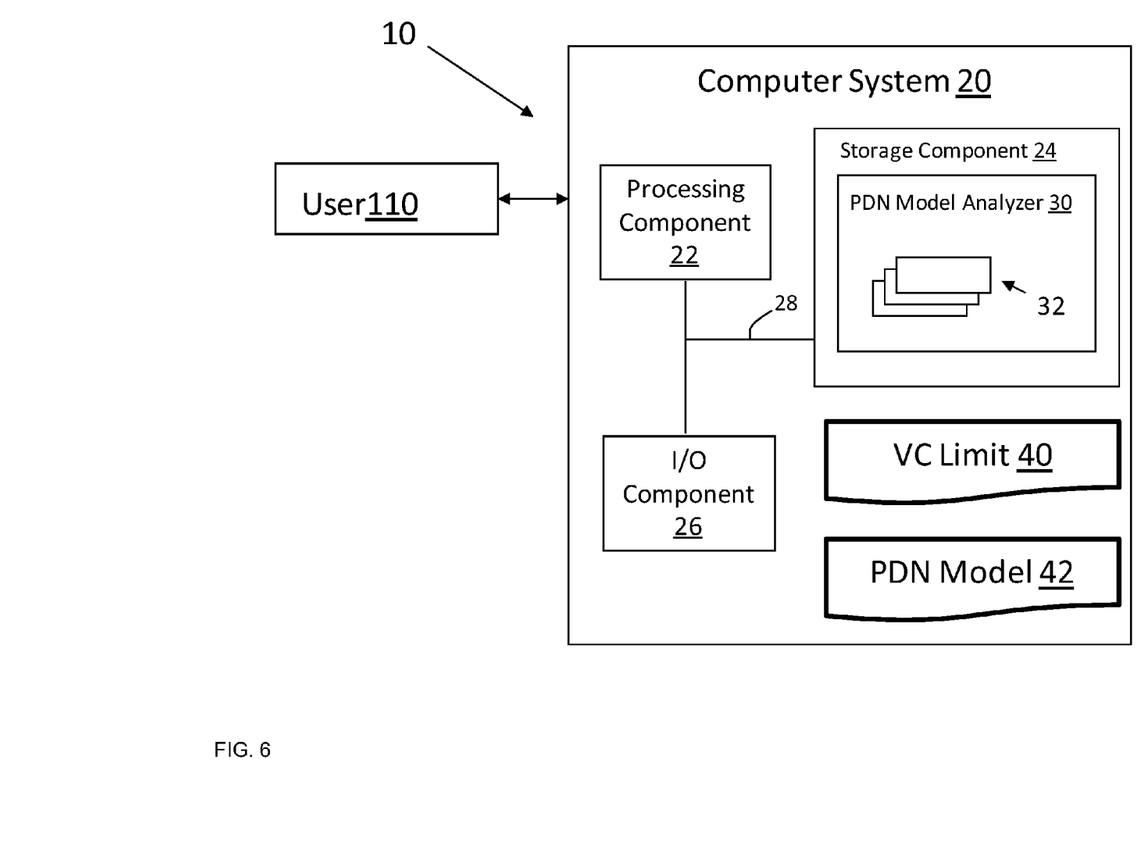
FIG. 6 shows an illustrative environment for reducing power supply noise within a system according to an embodiment of the invention.

Turning to the drawings, FIG. 6 shows an illustrative environment 10 for reducing power supply noise within a PDN of a system according to an embodiment. To this extent, environment 10 includes a computer system 20 that can perform a process described herein in order to reduce power supply noise. In particular, computer system 20 is shown including a PDN Model analyzer 30, which makes computer system 20 operable to reduce power supply noise by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as PDN Model analyzer 30, which is at least partially fixed in storage component 24. While executing program code, processing component 22 can process data, which can result in reading and/or writing transformed data from/to storage component 24 and/or I/O component 26 for further processing. Pathway 28 provides a communications link between each of the components in computer system 20. I/O component 26 can comprise one or more human I/O devices, which enable a human user 12 to interact with computer system 20 and/or one or more communications devices to enable a system user 12 to communicate with computer system 20 using any type of communications link. To this extent, PDN Model analyzer 30 can manage a set of interfaces (e.g., graphical user interface(s), application program interface, and/or the like) that enable human and/or system users 12 to interact with PDN Model analyzer 30. Further, PDN Model analyzer 30 can manage (e.g., store, retrieve, create, manipulate, organize, present, etc.) the data, such as voltage compression (VC) limit data 40 and/or PDN model 42, using any solution.

In any event, computer system 20 can comprise one or more general purpose computing articles of manufacture (e.g., computing devices) capable of executing program code, such as PDN Model analyzer 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, PDN Model analyzer 30 can be embodied as any combination of system software and/or application software.

Further, PDN Model analyzer 30 can be implemented using a set of modules 32. In this case, a module 32 can enable computer system 20 to perform a set of tasks used by PDN Model analyzer 30, and can be separately developed and/or implemented apart from other portions of PDN Model analyzer 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 20.

When computer system 20 comprises multiple computing devices, each computing device can have only a portion of PDN Model analyzer 30 fixed thereon (e.g., one or more modules 32). However, it is understood that computer system 20 and PDN Model analyzer 30 are only representative of various possible equivalent computer systems that may perform a process described herein. To this extent, in other embodiments, the functionality provided by computer system 20 and PDN Model analyzer 30 can be at least partially implemented by one or more computing devices that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described above, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, PDN Model analyzer 30 enables computer system 20 to reduce power supply noise in a PDN Model 42. To this extent, PDN Model analyzer 30 may perform the method described in FIG. 2. However, a user may first design a PDN Model 42 that includes a representation of a PCB 102, a package 104, and an IC 106, as shown in FIG. 1. In any event, computer system 20 can obtain VC limit 40 using any solution. For example, computer system 20 can generate and/or be used to generate VC limit 40, retrieve VC limit 40 from one or more data stores, receive VC limit 40 from another system, and/or the like.

While shown and described herein as a method and system for reducing power supply noise within a PDN of an electronic system, it is understood that aspects of the invention further provide various alternative embodiments. For example, in one embodiment, the invention provides a computer program fixed in at least one computer-readable medium, which when executed, enables a computer system to reduce power supply noise within a PDN of an electronic system. To this extent, the computer-readable medium includes program code, such as PDN Model analyzer 30 (FIG. 6), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as PDN Model analyzer 30 (FIG. 6), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for reduce power supply noise within a PDN of a system. In this case, a computer system, such as computer system 20 (FIG. 6), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to reduce power supply noise within a PDN of an IC as described herein. In this case, the service provider can manage (e.g., create, maintain, support, etc.) a computer system, such as computer system 20 (FIG. 6), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for reducing power supply noise within an electronic system including an integrated circuit (IC), a package, and a printed circuit board (PCB) connected by a plurality of power delivery networks (PDN), the method comprising:

defining a voltage compression limit for each PDN of the electronic system;

determining a voltage compression for each PDN of the electronic system during a plurality of switching events, wherein the plurality of switching events includes: a single switching event after a period of no event, multiple switching events, and a switching event that excites resonance within the electronic system;

comparing the voltage compression of each PDN of the electronic system to the voltage compression limit for each switching event; and in response to the voltage compression of a PDN of the electronic system exceeding the limit for the PDN, modifying the electronic system to reduce the voltage compression below the limit for the PDN.

2. The method of claim 1, further comprising determining which of the plurality of switching events is a dominant switching event.

3. The method of claim 2, wherein, in response to determining that the single switching event is the dominant switching event, the modifying includes adding on-chip capacitance until the voltage compression is below the limit.

4. The method of claim 2, wherein, in response to determining that multiple switching events is the dominant switching event, the modifying includes adding on-chip capacitance or package capacitors until the voltage compression is below the limit.

5. The method of claim 2, wherein, in response to determining the switching event that excites resonance is the dominant switching event, the modifying includes adding package capacitors until the voltage compression is below the limit.

6. The method of claim 1, further comprising determining that trans-noise is a significant component of the voltage compression of a PDN of the electronic system.

7. The method of claim 6, further comprising determining that the voltage compression of a PDN exceeds the voltage compression limit of the PDN, and modifying the system until the voltage compression is below the limit, whereby modifying includes adding on-chip capacitance.

8. A non-transitory computer-readable medium, which when executed, enables a computer system to implement a method of reducing power supply noise within an electronic system, the method comprising:
    designing a model of the electronic system, the model including a circuit representation of an integrated circuit (IC), a package, and a printed circuit board (PCB) connected by a plurality of power delivery networks (PDN);
    defining a voltage compression limit for each PDN of the electronic system;
    determining a voltage compression for each PDN of the electronic system during a plurality of switching events, wherein the plurality of switching events includes: a single switching event after a period of no event, multiple switching events, and a switching event that excites resonance within the electronic system;
    comparing the voltage compression of each PDN of the electronic system to the voltage compression limit for each switching event; and
    in response to the voltage compression of a PDN of the electronic system exceeding the limit for the PDN, modifying the electronic system to reduce the voltage compression below the limit for the PDN.

9. The non-transitory computer-readable medium of claim 8, further comprising determining which of the plurality of switching events is a dominant switching event.

10. The non-transitory computer-readable medium of claim 9, wherein, in response to determining that the single switching event is the dominant switching event, the modifying includes adding on-chip capacitance until the voltage compression is below the limit.

11. The non-transitory computer-readable medium of claim 9, wherein, in response to determining that multiple switching events is the dominant switching event, the modifying includes adding on-chip capacitance or package capacitors until the voltage compression is below the limit.

12. The non-transitory computer-readable medium of claim 9, wherein, in response to determining the switching event that excites resonance is the dominant switching event, the modifying includes adding package capacitors until the voltage compression is below the limit.

13. The non-transitory computer-readable medium of claim 8, further comprising determining that trans-noise is a significant component of the voltage compression of a PDN of the electronic system.

14. The non-transitory computer-readable medium of claim 13, further comprising determining that the voltage compression of a PDN exceeds the voltage compression limit of the PDN, and modifying the system until the voltage compression is below the limit, whereby modifying includes adding on-chip capacitance.

15. The non-transitory computer-readable medium of claim 8, wherein the modifying includes adding at least one of: on-chip capacitors, package capacitors, PCB capacitors, parallel connections between the IC and the package, parallel connections between the package and the PCB, or adding parallel vias in the package or the PCB.

16. A computer-implemented method of reducing power supply noise within an integrated circuit (IC), the method comprising:
    designing a model of the electronic system, the model including a circuit representation of an integrated circuit (IC), a package, and a printed circuit board (PCB) connected by a plurality of power delivery networks (PDN);
    defining a voltage compression limit for each PDN of the electronic system;
    determining a voltage compression for each PDN of the electronic system during a plurality of switching events, wherein the plurality of switching events includes: a single switching event after a period of no event, multiple switching events, and a switching event that excites resonance within the electronic system;
    comparing the voltage compression of each PDN of the electronic system to the voltage compression limit for each switching event;
    determining, based on the comparing, which of the plurality of switching events is a dominant switching event for each PDN of the electronic system, wherein the dominant switching event is a switching event with the most voltage compression; and
    in response to the voltage compression of each PDN of the electronic system exceeding the limit for the PDN during the dominant switching event, modifying the electronic system to reduce the voltage compression below the limit for the PDN.

17. The non-transitory method of claim 16, wherein the modifying includes adding at least one of: on-chip capacitors, package capacitors, PCB capacitors, parallel connections between the IC and the package, parallel connections between the package and the PCB, or adding parallel vias in the package or the PCB.

18. The non-transitory method of claim 16, further comprising determining that trans-noise is a significant component of the voltage compression of a PDN of the electronic system.

* * * * *